United States Patent
Pourmand et al.

(12) 
(10) Patent No.: US 6,220,328 B1
(45) Date of Patent: Apr. 24, 2001

(54) LAMINATION MACHINE

(75) Inventors: Nasser Pourmand, Encino; John James Boyer, Yorba Linda, both of CA (US)

(73) Assignee: Textile Systems & Supply, Inc., Los Angeles, CA (US)

(*) Notice: Subject to any disclaimer, the term of this patent is extended or adjusted under 35 U.S.C. 154(b) by 0 days.

(21) Appl. No.: 09/404,240

(22) Filed: Sep. 23, 1999

(51) Int. Cl.[7] .............................. B30B 5/06; B30B 15/34
(52) U.S. Cl. .................. 156/498; 156/555; 156/583.5; 100/154; 100/310; 100/312
(58) Field of Search .................... 156/498, 555, 156/580, 582, 583.1, 583.5; 425/371; 100/154, 309, 310, 311, 312

(56) References Cited

U.S. PATENT DOCUMENTS

| | | | |
|---|---|---|---|
| 4,334,468 | * 6/1982 | Guttinger et al. | 100/93 RP |
| 4,406,719 | * 9/1983 | Mitsumoto et al. | 156/52 |
| 4,645,559 | 2/1987 | Kaiser et al. | 156/583.1 |
| 4,659,425 | * 4/1987 | Eggers et al. | 156/630 |
| 4,721,542 | 1/1988 | Schaublin | 156/353 |
| 4,728,385 | 3/1988 | Hell | 156/353 |
| 4,897,147 | 1/1990 | Inselmann | 156/498 |
| 4,997,507 | * 3/1991 | Meyer | 156/286 |
| 5,034,087 | * 7/1991 | Denker et al. | 156/555 |
| 5,261,997 | 11/1993 | Inselmann | 156/580 |
| 5,378,304 | * 1/1995 | Denker | 156/555 |
| 5,501,764 | 3/1996 | Inselmann | 156/580 |
| 5,611,267 | * 3/1997 | Lauderbaugh | 100/38 |
| 5,711,214 | * 1/1998 | Lauderbaugh et al. | 100/48 |
| 5,791,239 | * 8/1998 | Lauderbaugh et al. | 100/48 |

OTHER PUBLICATIONS

Kannegiesser; "Quality Fusing for Quality Fabrics"; 6 pages.
Brandwise Reliant Limited; "Powerbond High Performance Laminating Technology"; 8 pages.
Meyer; "Laminating Stabilizing Calibrating Coating"; 6 pages.

* cited by examiner

*Primary Examiner*—James Sells
(74) *Attorney, Agent, or Firm*—Kit M. Stetina; Stetina Brunda Garred & Brucker

(57) ABSTRACT

A lamination machine for adhesively heat laminating adjacent surfaces of two or more layers of material to each other. The machine includes upper and lower opposing conveyor belts disposed one above the other to form a lamination passage therebetween and through which layers of material travel during lamination. At least one pressure roller is tensioned against the layers to be laminated. A heating module is disposed between the entrance and pressure roller, while a cooling module is disposed between the pressure roller and an exit. The heating module provides a plurality of rigidly maintained single-structure extruded heater components for melting an adhesion constituent disposed between the layers of material in preparation for lamination. Once the layers are pressured together to form a laminated product, that laminated product immediately enters the cooling module bearing a plurality of rigidly maintained single-structure extruded cooler components for cooling the laminated product as it travels through the cooling module. Rigidity of both the heater and cooler components can be enhanced by mounting hollow channels of both on respective rigid tubes. In this manner, a beneficial generally non-elastic lamination pathway is maintained for uniform production of laminated goods.

9 Claims, 4 Drawing Sheets

US 6,220,328 B1

LAMINATION MACHINE

CROSS-REFERENCE TO RELATED APPLICATIONS (Not Applicable)

STATEMENT RE: FEDERALLY SPONSORED RESEARCH/DEVELOPMENT (Not Applicable)

FIELD OF THE INVENTION

This invention relates in general to lamination equipment for laminating two or more layers of material to each other through a heat activated adhesion constituent exemplified by heat activated adhesive or inherent thermoplasticity to form a laminated product, and in particular to a flat-bed lamination machine having a heating module for melting the adhesion constituent prior to lamination of the layers of material and a cooling module for cooling a resultant laminated product and any applied finish coating.

BACKGROUND OF THE INVENTION

Lamination of two or more layers of material is an extremely important process in the production of a myriad of goods. Such lamination typically involves the bonding of adjacent surfaces of two layers of different textile or wood products to each other with heat-sensitive adhesive. The two layers typically are fed into a lamination machine where both heat and physical pressure are applied to consequently activate the adhesive and retain the layers together as a laminated product. Non-limiting examples of such laminated products include garments with backings, wadding, or decorative panels, carpets and draperies with backings and linings, furniture upholstery and bedding covers, automotive products, aerospace parts, footwear, woodworking and wood lamination products, and scores of other domestic arid industrial commodities.

While lamination machines are known, these machines provide heat and physical lamination pressure, but many times are ineffective in cooling the joined layers of material after melting of an adhesion constituent is completed and a laminated product is formed. In particular, a cooler component of the prior art may include only a single coolant circulation conduit disposed in a non-rigid housing to result in inefficient contact coupled with inefficient cooling of a laminated product. As a result, hot laminated products with correspondingly produced hot laminates emerge from the lamination process to require significant time and space commitments while cooling and adhesive setting occurs. It is therefore apparent that a need is present for a lamination and coating process wherein laminated products are delivered more rapidly after lamination in a usable or storable state. Accordingly, a primary object of the present invention is to provide a lamination machine that provides effective and relatively rapid cooling of laminated products immediately after a lamination coating procedure is completed.

Another object of the present invention is to provide a lamination machine whose cooling zone is served by a plurality of cooler components having chambers in communication with a cooling fluid.

Yet another object of the present invention is to provide a lamination machine whose chambered cooler components are substantially rigid to thereby reject bowed movement away from the central cooling zone.

These and other objects of the present invention will become apparent throughout the description thereof which now follows.

SUMMARY OF THE INVENTION

The present invention is a lamination machine for adhesively heat laminating adjacent surfaces of two or more layers of material to each other. The machine comprises, first of all, upper and lower continuous opposing conveyor belts disposed one above the other to form a lamination passage therebetween and through which layers of material can travel during lamination and ultimately to an exit. Physical pressure for lamination is maintained by at least one pressure roller tensioned against the layers of material to be laminated.

The lamination machine includes a heating zone, disposed between the upper and lower conveyor belts between the entrance and the pressure roller, and a cooling zone, disposed between the upper and lower conveyor belts between the pressure roller and the exit. The heating zone is a module providing a plurality of substantially rigid respective heater components positioned immediately above and immediately below the upper and lower conveyor belts for melting a heat activated adhesion constituent disposed between layers of material to be laminated when such layers travel there through in preparation for adhesion. Each heater component is an elongate one-piece heat-conductive extrusion structure with a generally T-shape cross section wherein a substantially hollow channel is disposed vertically and a plurality of walled chambers in communication with respective heat sources are disposed horizontally. Preferably, to enhance heater component rigidity, a rigid rectangular tube is disposed within the hollow channel and extends beyond each end of the channel to expose a first and second end thereof, with each end having respective connector mounts for mounting the tube to a support bar to thereby secure the associated heater component.

Once the layers of material are pressured together by the pressure roller to form a laminated product, that formed laminated product immediately enters the cooling zone disposed between the upper and lower conveyor belts between the pressure roller and the exit. In particular, the cooling zone is a module providing a plurality of substantially rigid respective cooler components positioned immediately above and immediately below the upper and lower conveyor belts for cooling the laminated product. Each cooler component is an elongate one-piece heat-conductive extrusion structure with a generally T-shape cross section wherein a substantially hollow channel is disposed vertically and a plurality of walled chambers in communication with respective cooling sources are disposed horizontally. Preferably, to enhance cooler component rigidity, a rigid rectangular tube is disposed within the hollow channel and extends beyond each end of the channel to expose a first and second end thereof, with each end having respective connector mounts for mounting the tube to a support bar to thereby secure the associated cooler component. In this manner, a heat-laminated product including a finish coating thereon can be produced more quickly because of proactive cooling after adhesive melt and material adhesion, thereby permitting greater efficiency in enhanced volume production of immediately usable product.

BRIEF DESCRIPTION OF THE SEVERAL VIEWS OF THE DRAWING

An illustrative and presently preferred embodiment of the invention is shown in the accompanying drawings in which.

DETAILED DESCRIPTION OF THE INVENTION

Figure 1:
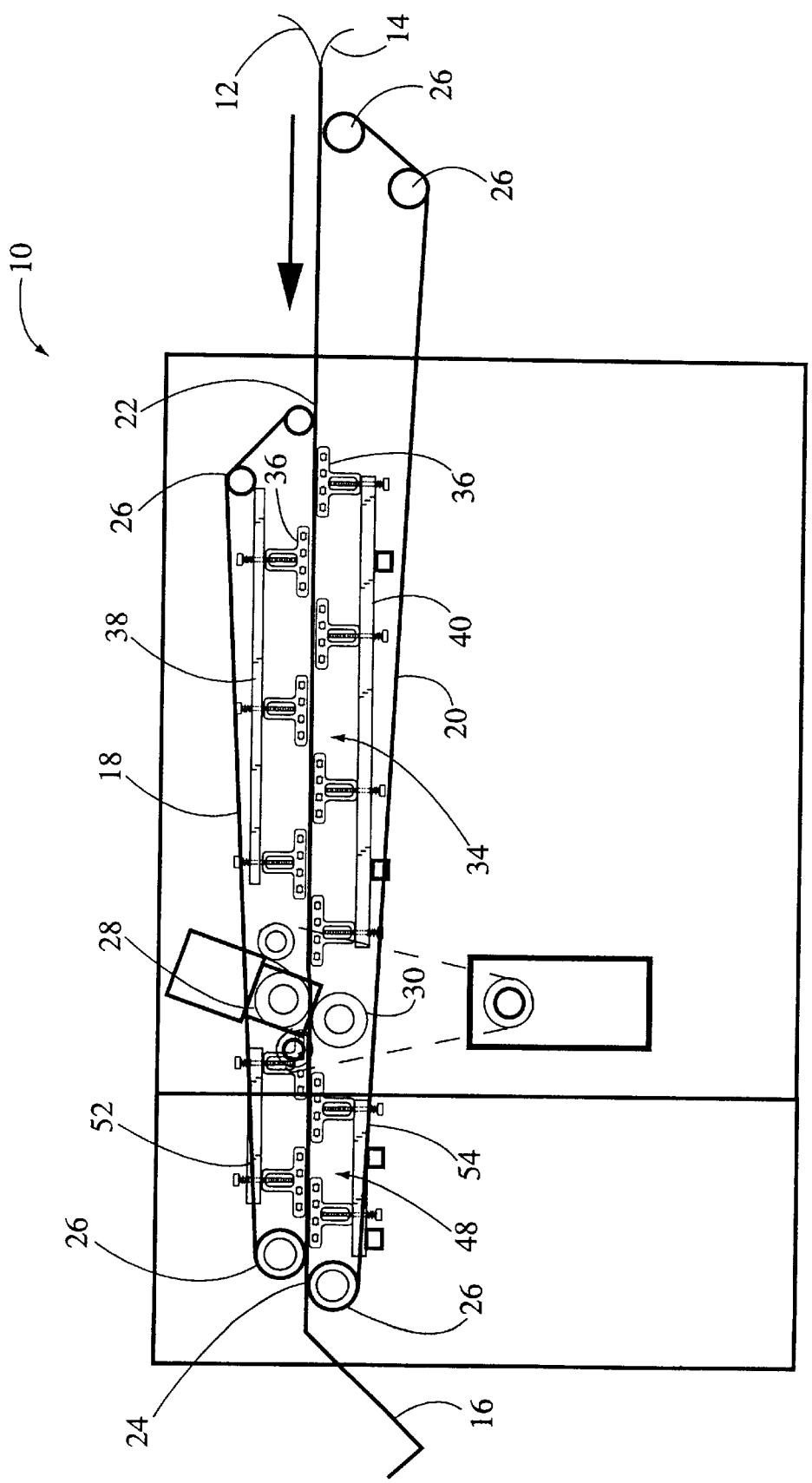
FIG. 1 is a schematic side elevation view in section of a fabric lamination machine.
Figure 2:
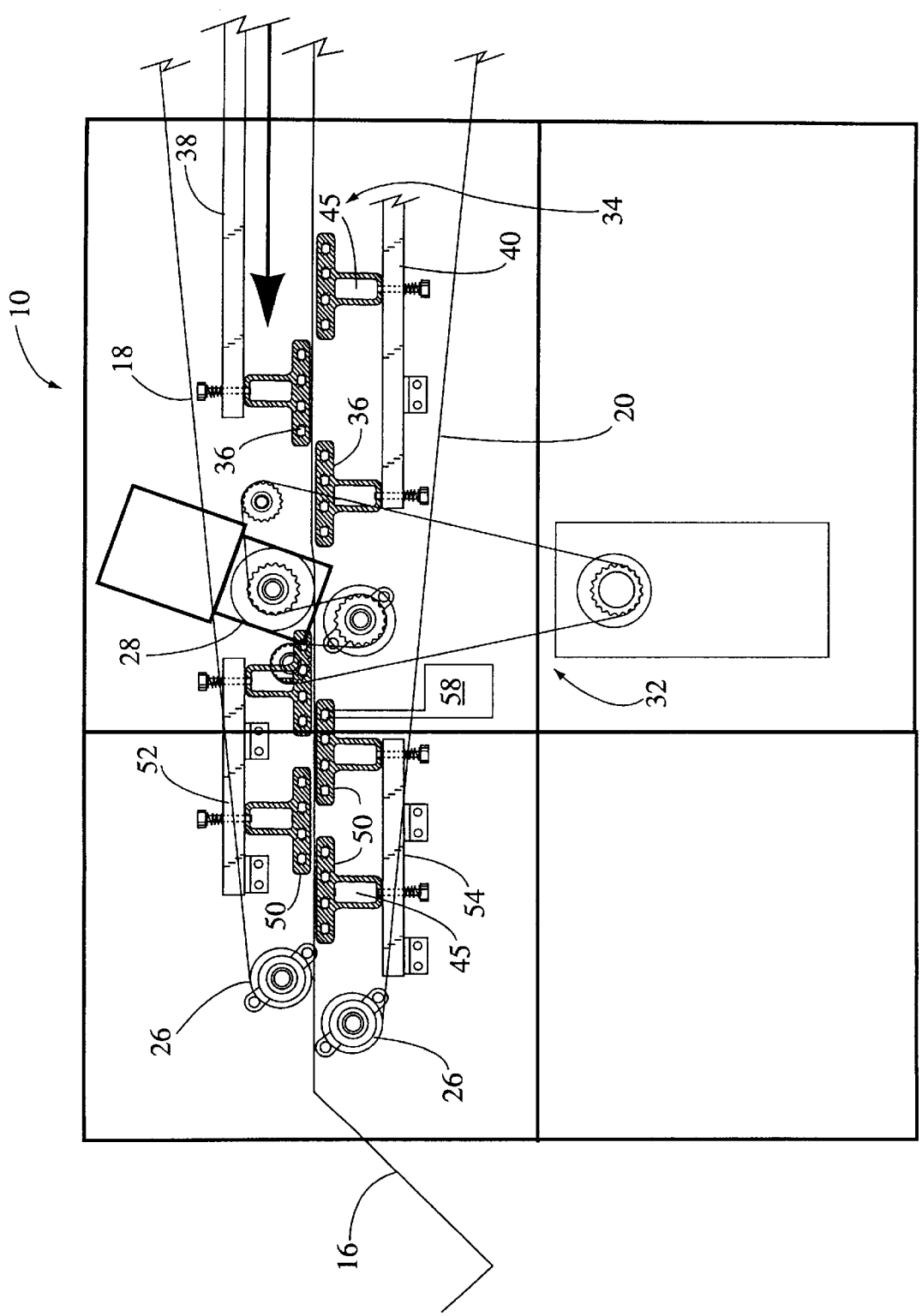
FIG. 2 is an enlarged schematic side elevation view in section of a portion of the fabric lamination machine of FIG. 1.

Referring to FIGS. 1 and 2, a lamination machine 10 for laminating adjacent surfaces of two layers 12, 14 of material non-limitedly here exemplified as textile fabric to each other is illustrated. The machine 10 has upper and lower continuous opposing conveyor belts 18, 20 in surface contact with each other and disposed one above the other to form a lamination passage therebetween having an entrance 22 through which the two layers 12, 14 of material travel when placed on the lower conveyor belt 20 for continued travel through the lamination passage to an exit 24. A plurality of standard guide rollers 26 conventionally maintain the belts 18, 20 taut and in place over respective courses of continuous travel.

Upper and lower opposing pressure rollers 28, 30 are tensioned against each other and disposed respectively above and below the opposing conveyor belts 18, 20 to thereby produce lamination pressure against the touching layers 12, 14 of material as the layers 12, 14 travel between these rollers 28, 30. As is illustrated in FIG. 2, the lower roller 30 is stationary while the upper roller 28 is provided with a standard belt network 32 allowing it to move vertically as thicknesses of material vary between the rollers 28, 30. While two opposing pressure rollers 28, 30 are exemplified, it is to be understood that only one such pressure roller could be employed so long as that roller provides tensioned pressure against a stop while layers of material pass between such a roller and the stop.

Figure 3A:
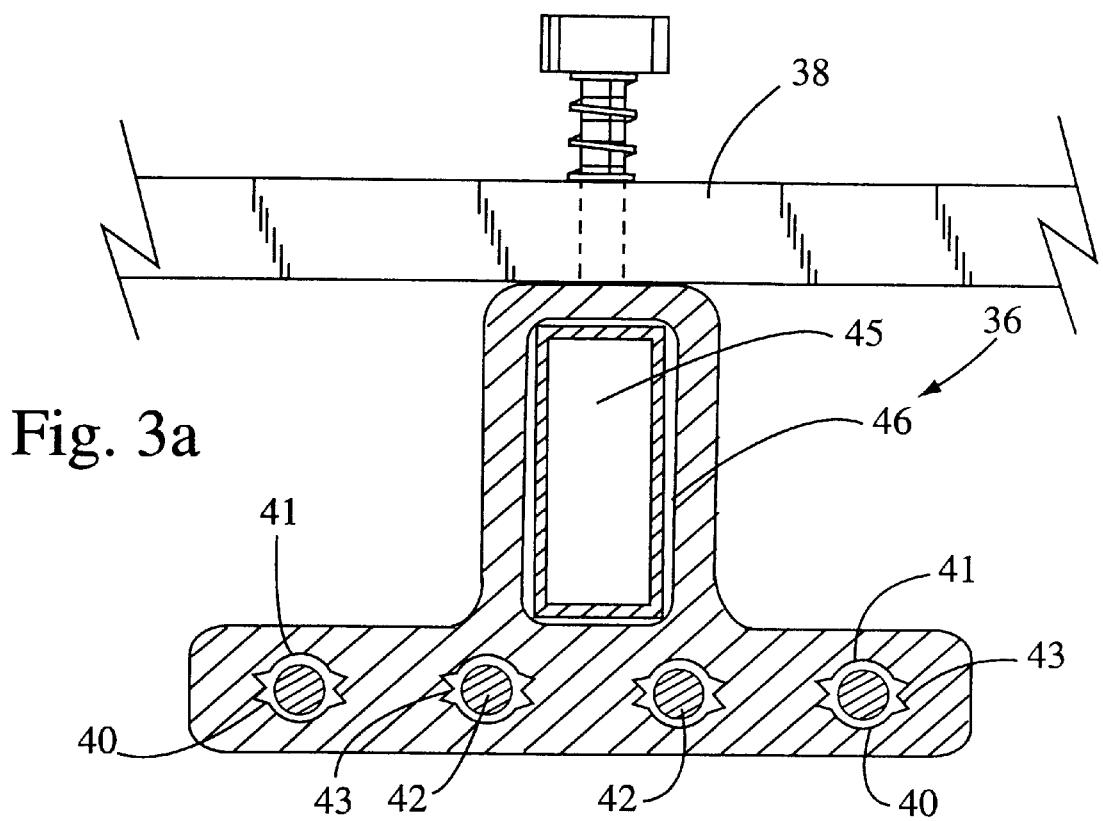
FIG. 3a is an enlarged side elevation view in section of a heater component.

A heating module generally shown as 34 is disposed between the upper and lower conveyor belts 18, 20 between the entrance 22 and the opposing rollers 28, 30. The heating module 34 includes a plurality of respective generally T-shaped extruded single-structure heater components 36 disposed on respective rectangular rigid steel tubes 45 that are conventionally spring or pneumatic-cylinder mounted on support bars 38, 40 to thereby tension bias the heater components 36 against and positioned immediately above and immediately below the upper and lower conveyor belts 18, 20 for heating heat-sensitive adhesive disposed between two layers of material 12, 14 to be laminated. As particularly shown in FIG. 3a, each heater component 36 has a plurality of horizontally aligned walled chambers 40 each accommodating a conventional electric heating element 42. The walls 44 of each chamber 40 have arc portions 41 complimentary in shape to the heating elements 42 and erratically configured portions 43 to provide a plurality of planes and thereby efficiently increase surface area where heat from the heating elements 42 can pass. The vertical portion of the T-shaped heater component 36 is a hollow channel 46, here non-limitedly exemplified as rectangular in cross-section, whose resultant configuration provides superior structural rigidity with reduced mass. Within the channel 46 is disposed a rectangular rigid steel tube 45 that functions to further enhance rigidity of the heater component 36.

Immediately downstream from the opposing rollers 28, 30 is a cooling module generally shown as 48 disposed between the upper and lower conveyor belts 18, 20 and substantially extending from the opposing rollers 28, 30 to the exit 24.

Figure 3B:
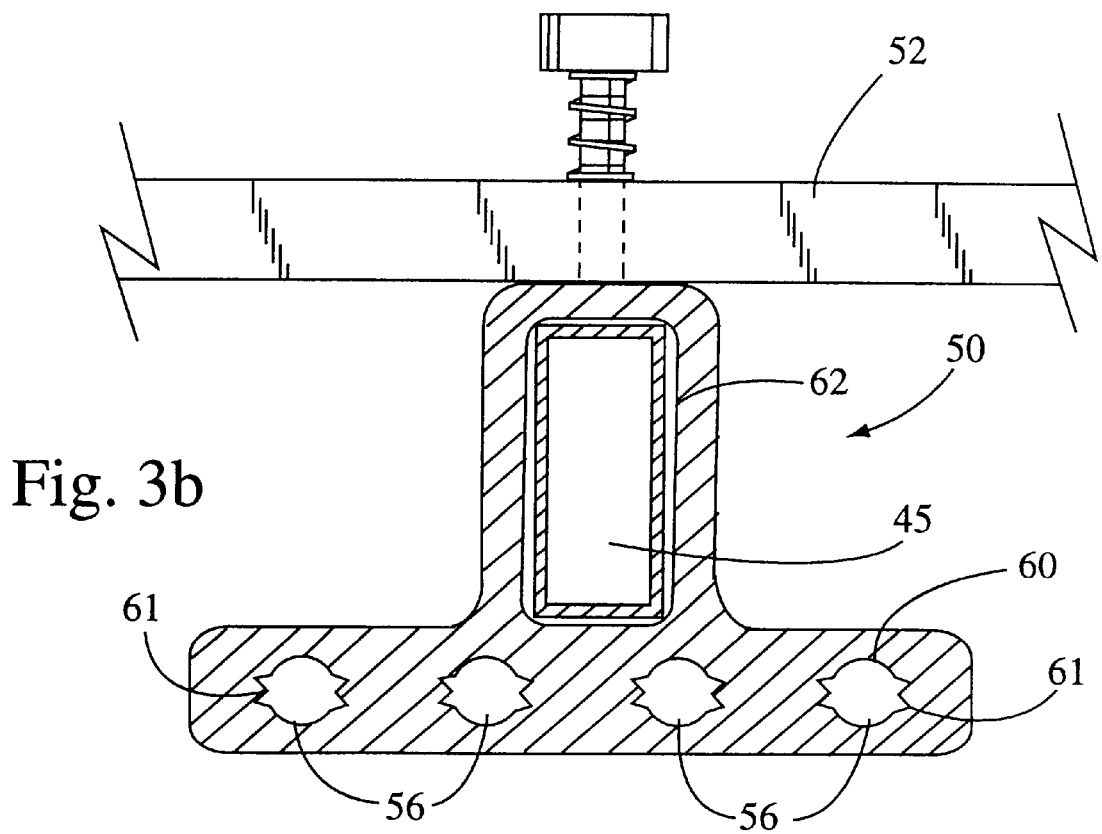
FIG. 3b is an enlarged side elevation view in section of a cooler component.
Figure 4:
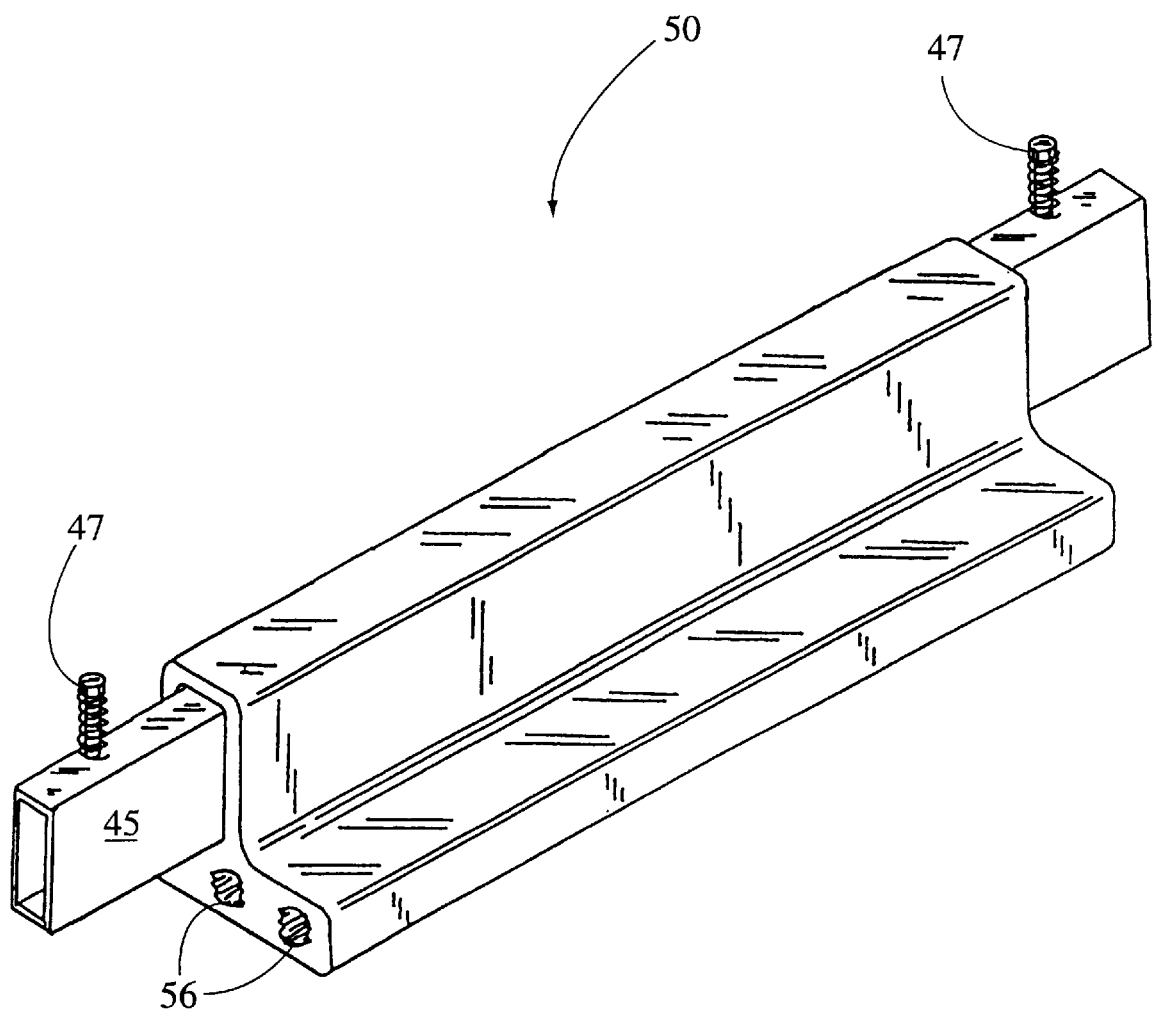
FIG. 4 is a perspective view of the cooler component of FIG. 3b.

The cooling module 48 includes a plurality of respective generally T-shaped extruded single-structure cooler components 50 disposed on respective rectangular rigid steel tubes 45 that are conventionally spring or pneumatic-cylinder mounted on support bars 52, 54 to thereby tension bias the cooler components immediately above and immediately below the upper and lower conveyor belts 18, 20 for cooling a laminated product 16 emerging from between the opposing rollers 28, 30. As is evident, the construction of the cooler component 50 is substantially identical to that of the heater component 36 minus the heating elements 42. As particularly shown in FIGS. 3b and 4, each cooler component 50 has a plurality of horizontally aligned walled chambers 56 each in conventional communication with a standard fluid supply reservoir 58 (FIG. 2) whose fluid can be refrigerated flowing gas or liquid. Portions 61 of the walls 60 of each chamber 56 are erratically configured to provide a plurality of planes and thereby efficiently increase surface area for heat transfer into cooling fluid flowing through the chambers 56. The vertical portion of the T-shaped cooler component 50 is a hollow channel 62, here non-limitedly exemplified as rectangular in cross-section, whose resultant configuration provides superior structural rigidity with reduced mass. Within the channel 62, as earlier described, is disposed a rectangular rigid steel tube 45 that functions to further enhance rigidity of the cooler component 50. In addition to enhancing rigidity, the tube 45 is provided with standard spring mounts 47, clearly shown in FIG. 4 in connection with a cooler component 50 and included in FIGS. 1–3b to illustrate relative placement, for identically mounting respective heater 36 or cooler 50 components to respective support bars 38, 40 or 52, 54.

In operation, two layers 12, 14 of material having heat-sensitive adhesive there between are inserted into the entrance 22 of the lamination passage to thereafter travel with the moving upper and lower continuous opposing conveyor belts 18, 20 into the heating module 34. The heating elements 42 within each chamber 40 of the heater components 36 are powered to thereby melt the adhesive whose melting temperature is reached prior to pressure application by the opposing rollers 28, 30. As the two layers of material 12, 14 pass within the pressure application of the rollers 28, 30, they become adhered to each other and form a laminated product 16. The now-laminated product 16 then proceeds into the cooling module 48 where cooling fluid is circulating through the chambers 56 of the cooler components 50 to thereby accept heat transfer from the hot laminated product 16 as travel progresses via the moving upper and lower continuous opposing conveyor belts 18, 20. Ultimately, the laminated product 16 reaches the exit 24 from which it emerges cooled and substantially ready for incorporation in the construction of goods.

While an illustrative and presently preferred embodiment of the invention has been described in detail herein for efficient production of a laminated product through incorporation of cooling for rapidly setting heat-sensitive lamination adhesion, it is to be understood that the inventive concepts may be otherwise variously embodied and employed and that the appended claims are intended to be construed to include such variations except insofar as limited by the prior art.

What is claimed is:

1. A lamination machine for laminating two or more layers of material to each other through employment of a heat activated adhesion constituent, the machine comprising:

a) upper and lower continuous opposing conveyor belts disposed one above the other to form a lamination passage therebetween having an entrance through which two layers of material can travel when placed on the lower conveyor belt for continued travel through the lamination passage to an exit;

b) at least one pressure roller tensioned against the layers of material to be laminated, whereby said layers of material traveling in contact with said at least one pressure roller are adhered to each other to form a laminated product;

c) a heating module disposed between the upper and lower conveyor belts between the entrance and the at least one pressure roller, said module comprising a plurality of substantially rigid respective heater components positioned immediately above and immediately below the upper and lower conveyor belts for melting said heat activated adhesion constituent disposed between said layers of fabric when said layers travel through the heating module, with each heater component comprising an elongate one-piece heat-conductive extrusion structure with a generally T-shape cross section wherein a substantially hollow channel is disposed vertically and a plurality of walled chambers in communication with respective heat sources are disposed horizontally; and d) a cooling module disposed between the upper and lower conveyor belts between said at least one pressure roller and the exit, said cooling module having a plurality of substantially rigid respective cooler components positioned immediately above and immediately below the upper and lower conveyor belts for cooling a laminated product subsequent to lamination thereof when said layers thereof travel through the cooling module, with each cooler component comprising an elongate one-piece heat-conductive extrusion structure with a generally T-shape cross section wherein a substantially hollow channel is disposed vertically and a plurality of walled chambers in communication with a cooling fluid are disposed horizontally.

2. A lamination machine as claimed in claim 1 wherein the hollow channel of each heater and cooler component is rectangular in cross section and additionally comprising a rigid rectangular tube disposed within the hollow channel and extending beyond each end of said channel to expose a first and second end thereof, with each of said first and second ends having connector mounts for mounting the tube to a support bar.

3. A lamination machine as claimed in claim 2 wherein the connector mounts are spring mounts.

4. A lamination machine as claimed in claim 1 wherein walls of the walled chambers of the heater components are configured in a plurality of planes.

5. A lamination machine as claimed in claim 4 wherein said walls have arc portions.

6. A lamination machine as claimed in claim 5 wherein the heat sources are electrical resistance rods disposed within the walled chambers and having a surface configuration complimentary to said arc portions.

7. A lamination machine as claimed in claim 1 wherein each heater component is tension biased against the conveyor belt above or below which said heater component is situated.

8. A lamination machine as claimed in claim 1 wherein walls of the walled chambers of the cooler components are configured in a plurality of planes.

9. A lamination machine as claimed in claim 1 wherein each cooler component is tension biased against the conveyor belt above or below which said cooler component is situated.

* * * * *